US009433924B2

(12) United States Patent
Kim et al.

(10) Patent No.: US 9,433,924 B2
(45) Date of Patent: Sep. 6, 2016

(54) METALOXIDE—ZRO2 CATALYSTS FOR THE ESTERIFICATION AND TRANSESTERIFICATION OF FREE FATTY ACIDS AND TRIGLYCERIDES TO OBTAIN BIO-DIESEL

(75) Inventors: Manhoe Kim, Troy, MI (US); Steven O. Salley, Grosse Pointe Park, MI (US); K. Y. Simon Ng, West Bloomfield, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 1156 days.

(21) Appl. No.: 13/508,738

(22) PCT Filed: Nov. 8, 2010

(86) PCT No.: PCT/US2010/055841
§ 371 (c)(1),
(2), (4) Date: Jul. 25, 2012

(87) PCT Pub. No.: WO2011/057196
PCT Pub. Date: May 12, 2011

(65) Prior Publication Data
US 2012/0283459 A1 Nov. 8, 2012

Related U.S. Application Data

(60) Provisional application No. 61/259,413, filed on Nov. 9, 2009.

(51) Int. Cl.
*B01J 21/06* (2006.01)
*B01J 21/08* (2006.01)
(Continued)

(52) U.S. Cl.
CPC ............. *B01J 21/066* (2013.01); *B01J 23/002* (2013.01); *B01J 23/06* (2013.01); *B01J 23/10* (2013.01);
(Continued)

(58) Field of Classification Search
CPC ...... B01J 21/06; B01J 21/063; B01J 21/066; B01J 21/08; B01J 23/10; B01J 23/002

USPC ............... 502/240, 242, 253, 302–304, 343, 502/349–350
See application file for complete search history.

(56) References Cited

U.S. PATENT DOCUMENTS

| 5,760,273 A * | 6/1998 | Inaba | ...................... C07C 68/06 502/302 |
| 6,762,149 B2 * | 7/2004 | Tonkovich | ........... B01J 37/0225 427/585 |

(Continued)

FOREIGN PATENT DOCUMENTS

| EP | 1 640 356 A1 | 3/2006 |
| WO | WO 2009/046636 A1 | 4/2009 |
| WO | WO 2010/104844 A2 | 9/2010 |

OTHER PUBLICATIONS

Diaz-Felix, W., et al., (2009). Pretreatment of yellow grease for efficient production of fatty acid methyl esters. *Biomass and Bioenergy*, 33(4), p. 558-563.

(Continued)

*Primary Examiner* — Patricia L Hailey
(74) *Attorney, Agent, or Firm* — Brinks Gilson & Lione

(57) ABSTRACT

Mixed metal oxide catalysts (ZnO, CeO, La2O3, NiO, Al2O3, SiO2, TiO2, Nd2O3, Yb2O3, or any combination of these) supported on zirconia (ZrO2) or hydrous zirconia are provided. These mixed metal oxide catalysts can be prepared via coprecipitation, impregnation, or sol-gel methods from metal salt precursors with/without a Zirconium salt precursor. Metal oxides/ZrO2 catalyzes both esterification and transesterification of oil containing free fatty acids in one batch or in single stage. In particular, these mixed metal oxides supported or added on zirconium oxide exhibit good activity and selectivity for esterification and transesterification. The low acid strength of this catalyst can avoid undesirable side reaction such as alcohol dehydration or cracking of fatty acids. Metal oxides/ZrO2 catalysts are not sensitive to any water generated from esterification. Thus, esterification does not require a water free condition or the presence of excess methanol to occur when using the mixed metal oxide catalyst. The FAME yield obtained with metal oxides/ZrO2 is higher than that obtained with homogeneous sulfuric acid catalyst. Metal oxides/ZrO2 catalasts can be prepared as strong pellets and in various shapes for use directly in a flow reactor. Furthermore, the pellet has a strong resistance toward dissolution to aqueous or oil phases.

3 Claims, 3 Drawing Sheets

(51) Int. Cl.
  *B01J 23/00* (2006.01)
  *B01J 23/06* (2006.01)
  *B01J 23/10* (2006.01)
  *B01J 23/80* (2006.01)
  *B01J 37/03* (2006.01)
  *C11C 3/00* (2006.01)

(52) U.S. Cl.
  CPC .............. *B01J 23/80* (2013.01); *B01J 37/031* (2013.01); *B01J 37/036* (2013.01); *C11C 3/003* (2013.01); *B01J 21/063* (2013.01); *B01J 2523/00* (2013.01); *C10G 2300/1003* (2013.01); *C10G 2300/1011* (2013.01); *Y02E 50/13* (2013.01); *Y02P 30/20* (2015.11)

(56) References Cited

U.S. PATENT DOCUMENTS

| | | | |
|---|---|---|---|
| 2004/0242917 A1 | 12/2004 | Inui et al. | |
| 2004/0267058 A1* | 12/2004 | Harmsen et al. | 568/867 |
| 2005/0266139 A1 | 12/2005 | Lacome et al. | |
| 2007/0003464 A1* | 1/2007 | Schimanski | B01J 21/08 423/326 |
| 2007/0021297 A1* | 1/2007 | Osora | B01J 27/053 502/240 |
| 2007/0093672 A1* | 4/2007 | Ryu | B01J 23/20 558/270 |

OTHER PUBLICATIONS

Faria, Elaine A., (2009). Nanosized and reusable SiO2/ZrO2 catalyst for highly efficient biodiesel production by soybean transesterification. *Journal of the Brazilian Chemical Society*, 20(9), p. 1732-1733.

Furuta, S., H. Matsuhashi, & K. Arata, (2004). Biodiesel fuel production with solid superacid catalysis in fixed bed reactor under atmospheric pressure. *Catalysis Communications*, 5(12), p. 721-723.

Furuta, S., H. Matsuhashi, & K. Arata, (2006). Biodiesel fuel production with solid amorphous-zirconia catalysis in fixed bed reactor. *Biomass and Bioenergy*, 30(10), p. 870-873.

Jitputti, J., B. Kitiyanan, et al. (2006). Transesterification of crude palm kernel oil and crude coconut oil by different solid catalysts. *Chemical Engineering Journal*, 116(1), p. 61-66.

Kawashima, A., K. Matsubara, & K. Honda, (2008). Development of heterogeneous base catalysts for biodiesel production. *Bioresource Technology*, 99(9), p. 3439-3443.

Lopez, D. E., J. G. Goodwin, et al. (2008). Esterification and transesterification using modified-zirconia catalysts. *Applied Catalysis A—General*, 339(1), p. 76-83.

Lopez, D.E., et al., (2007). Esterification and transesterification on tungstated zirconia: Effect of calcination temperature. *Journal of Catalysis*, 247(1), p. 43-50.

Lopez, D.E., et al., (2008). Esterification and transesterification using modified-zirconia catalysts. *Applied Catalysis A—General*, 2008. 339(1), p. 76-83.

Lotero, E., et al., (2005). Synthesis of biodiesel via acid catalysis. *Industrial & Engineering Chemistry Research*, 44(14), p. 5353-5363.

McNeff, C.V., et al., (2008). A continuous catalytic system for biodiesel production. *Applied Catalysis a—General*, 343(1-2), p. 39-48.

Meneghetti, S.M.P., et al., (2006). Ethanolysis of castor and cottonseed oil: A systematic study using classical catalysts. *Journal of the American Oil Chemists Society*, 83(9), p. 819-822.

Oliveira, J.F.G., et al., (2006). Biodiesel production from waste coconut oil by esterification with ethanol: The effect of water removal by adsorption. *Renewable Energy*, 35(11), p. 2581-2584.

Sree, R., N. S. Babu, et al. (2009). Transesterification of edible and non-edible oils over basic solid Mg/Zr catalysts. *Fuel Processing Technology*, 90(1), p. 152-157.

Wang, H., M. H. Wang, et al. (2006). Influence of preparation methods on the structure and performance of CaO—ZrO2 catalyst for the synthesis of dimethyl carbonate via transesterification. *Journal of Molecular Catalysis a—Chemical*, 258(1-2), p. 308-312.

Zabeti, M., W. Daud, & M.K. Aroua, (2009). Activity of solid catalysts for biodiesel production: A review. *Fuel Processing Technology*, 90(6), p. 770-777.

* cited by examiner

METALOXIDE—ZRO2 CATALYSTS FOR THE ESTERIFICATION AND TRANSESTERIFICATION OF FREE FATTY ACIDS AND TRIGLYCERIDES TO OBTAIN BIO-DIESEL

CROSS REFERENCE TO RELATED APPLICATIONS

The present application claims the benefit of priority to PCT Application No. PCT/US2010/055841, filed Nov. 8, 2010, which application claims the benefit of U.S. Provisional Patent Application No. 61/259,413, filed Nov. 9, 2009, the entirety of which is hereby incorporated by reference.

FEDERALLY SPONSORED RESEARCH AND DEVELOPMENT

This invention was made with government support under Contract No. DEFG36-05G085005 awarded by the U.S. Department of Energy. The U.S. government may retain certain rights to the invention.

FIELD

This disclosure relates generally to mixed-metal oxide catalysts. More specifically this disclosure relates to the use of mixed-metal oxide catalysts alone or supported on zirconia to facilitate esterification and/or transesterification reactions.

BACKGROUND

Biodiesel, which is a renewable fuel that has similar combustion properties to fossil diesel, is normally produced by the transesterification of highly refined oils with short-chain alcohols. Since biodiesel can significantly decrease the emission of $CO_2$, $SO_x$, and unburned hydrocarbons from the exhaust of motor vehicles, it is environmentally beneficial, and therefore, a promising alternative to fossil diesel.

Biodiesel is typically produced in a conventional manufacturing operation via the catalyzed esterification and trans-esterification of free fatty acids (FFA) and triglycerides, respectively. In this reaction the oil or fat is reacted with an alcohol to form the biodiesel and glycerine. Such a conventional operation will usually use a strong basic (e.g., NaOH or KOH) or acidic (e.g., $H_2SO_4$) solution as a homogeneous catalyst and highly refined oils as the feedstock. These homogeneous catalysts are quite sensitive to the presence of FFA and water in the oil feedstock. FFA is known to react with basic catalysts (i.e., NaOH or KOH) to form soaps. The formation of soaps will subsequently complicate the separation of glycerol from the reaction mixture, thereby, drastically reducing the yield of fatty acid methyl esters (FAME).

The price of the oil feedstock is a dominating economic factor associated with the manufacturing of biodiesel products. The cost associated with using a highly refined oil feedstock is high due to the demand for these oils in multiple industries, such as the food, cosmetics, and livestock feed industries. In fact, the cost of the oil feedstock can account for up to a total of 80% of the cost to produce biodiesel. In order to reduce the cost associated with forming biodiesel products, other less expensive feedstocks, such as waste oils (e.g. yellow grease and brown grease) and acidulated soaps will need to be utilized.

Waste oils are different from refined or crude oils by the presence of free fatty acids (FFAs) that are generated through the hydrolysis of triglycerides during a typical cooking process. For example, yellow grease is typically used-frying oils recovered from deep fryers, whereas brown grease is the grease that is recovered from a waste water component called a grease trap. The FFA content in the oil directly affects the price of the feedstock, e.g., the FFA level in yellow grease at <15% and in brown grease at >15% results in the brown grease being less expensive than yellow grease.

The ability to use a variety of less expensive, lower grade oils or lipids would make biodiesel much more competitive with petroleum-based fuels. Accordingly there exists a continual need or desire to develop new catalysts for use in biodiesel production that will allow such lower grade oils to be utilized.

SUMMARY

In satisfying the above need, as well as overcoming the enumerated drawbacks and other limitations of the related art, the present disclosure provides a heterogeneous catalyst system for use in facilitating esterification or transesterification reactions in an acidic chemical stream. The catalyst system comprises one metal oxide or mixed metal oxides with at least one component being selected from the group of ZnO, NiO, $SiO_2$, $TiO_2$, $Nd_2O_3$, $Yb_2O_3$, $CeO_x$, $Al_2O_3$, $La_2O_3$; and an oxide support of $ZrO_2$, hydrous $ZrO_2$, or a mixture thereof. The metal oxide and the oxide support interact such that the metal oxide is chemically stable and has durability in an acidic chemical stream.

According to another aspect of the present disclosure, a method of forming a heterogeneous catalyst system for use in facilitating esterification or transesterification reactions is provided. The method generally comprises the steps of providing at least one metal salt; dissolving the metal salt in a liquid to form acidic or basic metal salt solutions; providing a zirconium medium, the medium being either $ZrO_2$ particles or a zirconium salt precursor that forms $ZrO_2$ particles; combining the metal salt solution with the zirconium medium; and forming at least one metal oxide incorporated into the structure of the $ZrO_2$ particles to form a metal oxide/$ZrO_2$ or mixed metal oxides/$ZrO_2$ catalyst using one selected from the group of a sol-gel condensation process, an impregnation process, or a co-precipitation process. The metal oxide/$ZrO_2$ catalyst is then recovered from the solution; allowed to age for a predetermined amount of time at a predetermined temperature; pelletized into a desired shape or size; and finally calcined at an elevated temperature for at least 30 minutes. The resulting calcined metal oxide/$ZrO_2$ or mixed metal oxides/$ZrO_2$ catalyst are ones supported metal oxides by $ZrO_2$. The supported metal oxides are combined with at least one metal oxide selected from the group of ZnO, NiO, $SiO_2$, $TiO_2$, $Nd_2O_3$, $Yb_2O_3$, $CeO_x$, $Al_2O_3$, $La_2O_3$.

According to yet another aspect of the present disclosure, a method of forming a biodiesel product from unrefined or waste oils is provided. This method generally comprises the steps of preparing a heterogeneous catalyst system as describe above and placing an unrefined or waste oil feedstock and an alcohol in contact with the catalyst system to form a reaction mixture. The mixture includes the oil and the alcohol, along with free fatty acids, water, or other impurities such as organo-metal and sulfur, among others. The mixture is then heated to a temperature that is between about 130° C. and 250° C.; and the transesterification of the oil and the esterification of the fatty free acids allowed to simultaneously occur for a predetermined amount of time to form fatty acid methyl esters resulting in a biodiesel product. Finally, the catalyst is separated from the biodiesel product in order to collect the biodiesel product.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
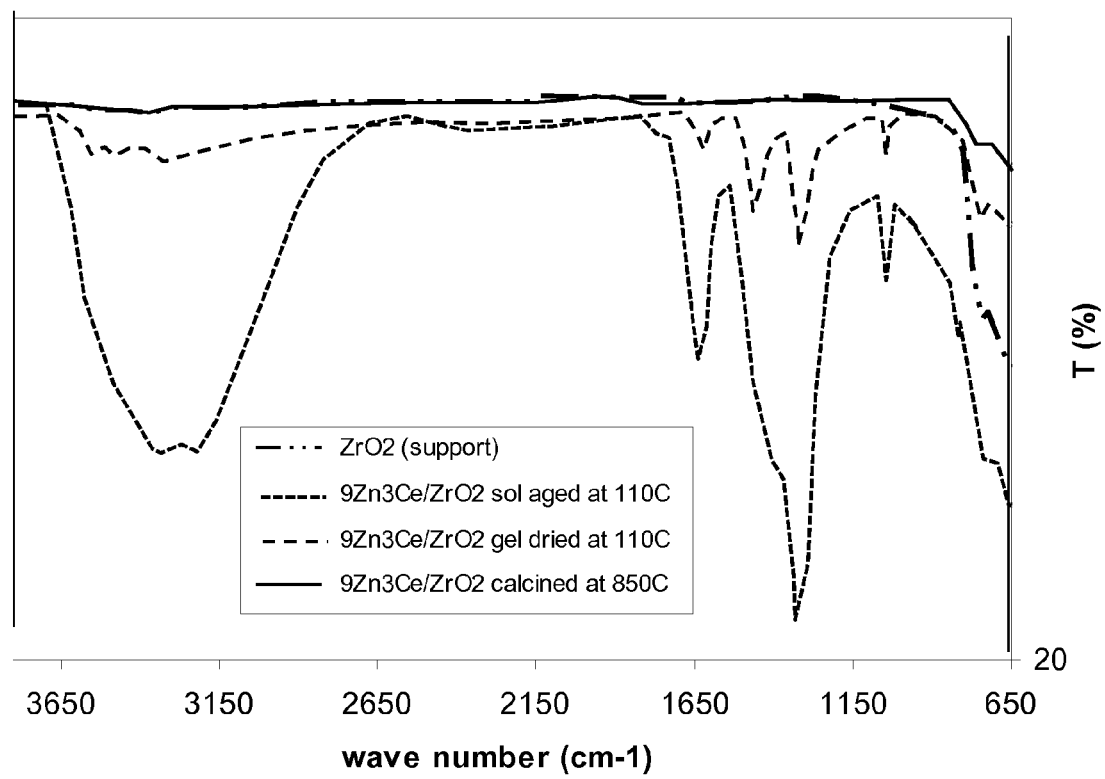
FIG. 1 is a comparison of infrared spectra measured at various levels of drying for a metal oxide supported zirconia catalyst prepared according to the teachings of the present disclosure.

The following description is merely exemplary in nature and is in no way intended to limit the present disclosure or its application or uses. It should be understood that throughout the description and drawings, corresponding reference numerals indicate like or corresponding parts and features.

The present disclosure generally provides mixed metal oxide catalysts for use in esterification and transesterification reactions. More specifically, the present disclosure provides mixed metal oxide catalysts, including but not limited to ZnO, NiO, $SiO_2$, $TiO_2$, $Nd_2O_3$, $Yb_2O_3$, $CeO_x$, $Al_2O_3$, $La_2O_3$, and combinations or mixtures thereof, used either alone or supported on zirconia ($ZrO_2$) or hydrous zirconia to facilitate esterification or transesterification reactions.

According to one aspect of the present disclosure, the catalysts are prepared via the use of a co-precipitation method, impregnation method, or sol-gel method. These methods use various metal salts either alone or mixtures of metal salts of following elements and compounds: Zn, Ni, Si, Ti, Nd, Yb, Ce, Al, and La and/or ZnO, NiO, $SiO_2$, $TiO_2$, $Nd_2O_3$, $Yb_2O_3$, $CeO_x$, $Al_2O_3$, and $La_2O_3$ in combination with $ZrO_2$ or hydrous $ZrO_x$, e.g., ZnO/$ZrO_2$, ZnOCeO$_2$/$ZrO_2$, ZnOLa$_2$O$_3$/$ZrO_2$, ZnONiO/$ZrO_2$, ZnOTiO$_2$Nd$_2$O$_3$/$ZrO_2$, ZnOSiO$_2$Yb$_2$O$_3$/$ZrO_2$, and ZnOTiO$_2$Nd$_2$O$_3$SiO$_2$Yb$_2$O$_3$/$ZrO_2$, among others. These metal oxides or zirconium supported metal oxides catalysts exhibit very high catalytic activity for esterification and transesterification reactions and a very high durability with respect to long-term performance.

The metal oxide or zirconium supported metal oxides catalysts of the present disclosure can be efficiently used with a low grade oil feedstock that contains free fatty acids and water impurities. In addition, these catalysts are insensitive to the presence of water arising from the esterification of the free fatty acids with alcohols. Very high yields of fatty acid methyl ester (FAME) products are obtained even when the feed streams have a low methanol to oil ratio. Thus, these catalysts are beneficial for use in the formation of biodiesel products because low grade oils can be efficiently utilized, thereby, reducing overall production costs. The impurities of free fatty acids, water, organo-metals, organic sulfur, etc. may be present in the feedstock without having a substantial detrimental effect on catalyst activity.

The percent yield of FAME products obtained from the use of various mixed metal oxides supported on zirconium oxide to catalyze the esterification and transesterification at 150° C. of a feedstock containing oil with a high level of FFA, methanol, and tetrahydrofuran in a volume ratio of about 7:5:2 is provided in Table 1. The low acid strength of these catalysts limits the occurrence of undesirable side reactions, such as alcohol dehydration or the cracking of fatty acids. The mixed metal oxides supported on zirconium oxide exhibit good activity and selectivity for esterification and transesterification even in the presence of a low methanol to oil ratio.

The $ZrO_2$ supported metal oxide catalysts can provide a higher product yield at a lower methanol to oleic acid ratio than conventional catalysts. When sulfuric acid is used as a catalyst in a conventional homogeneous system, the mean equilibrium conversion of free fatty acid is 0.859 for the following conditions: methanol:oleic acid molar ratio 60:1; sulfuric acid concentration 5 wt %; agitation speed 600 rpm; and temperature of 70 to 100° C. In esterification reactions, the presence of water favors the reverse hydrolysis reaction. Water also helps to promote the deactivation of the acid catalyst due to the formation of $H_3O^+$ by solvation within the reaction system. The decreased activity of the catalytic protons is believed to cause them to be preferentially solvated by water over methanol. In addition, sulfuric acid catalyzed esterification requires a large excess of methanol in order for the reaction to reach a high yield. A large amount of methanol usage impacts the economics of the process due to increasing costs associated with methanol recovery.

Generally, the FAME yield level from esterification is very sensitive to the ratio of alcohol to oil ratio when homogeneous liquid acid catalysts are used. However, the yield level is much less dependent on the alcohol to oil ratio when the $ZrO_2$ supported metal oxides catalysts of the present disclosure are used. Conventional catalyst systems typically require the use of a high alcohol to oil ratio (>30). The $ZrO_2$ supported metal oxide catalysts can decrease this methanol to oil ratio to a value of less than 10, preferably less than about 4. Thus a process using $ZrO_2$ supported metal oxides catalyst can decrease the operating cost associated with recovering any unreacted alcohol from the biodiesel product.

TABLE 1

| Catalyst | Feed 100% FFA | Feed 67% FFA |
|---|---|---|
| ZnO/ZrO2 | 89.5 | 54.6 |
| ZnO—La2O3/ZrO2 | 74 | 45.9 |
| ZnO—Al2O3/ZrO2 | 63.9 | 79.6 |
| ZnO—NiO/ZrO2 | 62.4 | 44.6 |

Generally, acid catalyzed esterification reaction requires very high ratio of methanol to free fatty acids to minimize the hydrolysis of fatty acid methyl esters (FAME) with water generated from esterification. Zirconium oxide is not sensitive to water existence which is generated from esterification. Thus, esterification with the use of a metal oxide supported zirconia catalyst does not require a water free condition or excess methanol condition. Equimolar ratios of the reactants (methanol:fatty acids) can reduce waste and simplify product separation, providing not only environmental but also economic benefits. The FAME yield obtained with metal oxide supported zirconium oxide catalysts is higher than that obtained with conventional homogeneous sulfuric acid catalyst after a one hour reaction period as shown Table 2. In Table 2, a feed stream of brown grease, methanol and tetrahydrofuran in a volume ratio of about 7:5:1 was reacted at a temperature of 200° C.

TABLE 2

| Catalyst | 1 hour | 2 hours |
|---|---|---|
| ZnO/ZrO$_2$ | 65% | 78% |
| ZnO—NiO/ZrO$_2$ | 55% | 60% |
| ZnO—La$_2$O$_3$ | 39% | 68% |
| Conventional H$_2$SO$_4$ | — | 70% |

In Table 3, the tolerability of metal oxide supported zirconia to water produced during the catalyzed esterification reaction is demonstrated. More specifically, even when the formation of up to about 2% water or even up to about 6% occurs over a 3 hour reaction period at 200° C., the yield of FAME produced in the presence of the metal oxide supported zirconia catalysts remains high.

TABLE 3

| Catalysts | Yield, % | Water Produced |
|---|---|---|
| ZnO/ZrO2 | 78 | Large - 6.4% |
| ZnO—La2O3/ZrO2 | 76 | Negligible |
| ZnO—Al2O3/ZrO2 | 73 | Negligible |
| ZnO—NiO/ZrO2 | 73 | Medium - 2.1% |

Heterogeneous catalysts offer several distinct advantages related to the simplicity of continuous production methods over batch methods. An ideal process would involve a continuous flow reaction that does not deactivate or consume the catalyst and that further minimizes or eliminates the need for multiple downstream separation and/or purification steps. One skilled-in-the-art will understand that most heterogeneous catalysts are unsuitable for packing in a high pressure and high temperature, continuous flow reactor that will be for long term esterification and transesterification reactions because of too small particle sizes and difficulty in making pellet types. When the particle size of a catalyst is small or the particle's mechanical strength is not strong enough, the catalyst can be lost from the reactor in the flow of the product stream or it may combine with viscous reactants to form a "sticky" gel that can result in the blocking or plugging of the reactor's product flow stream. However, the catalysts prepared according to the present disclosure reduce the occurrence of these situations because the metal oxide supported zirconia catalysts can be processed into mechanically very strong pellets. Furthermore, these pellets, which can be shaped as desired using any type of pelletizing device known to one skilled-in-the-art, have a strong resistance toward dissolution in aqueous or oil phases.

Referring to FIG. 1, the infrared spectrum of a metal oxide supported on zirconia catalyst is shown at various stages of preparation including stabilization of a sol gel aged at 110° C. and dried at 110° C. The infrared spectrum for the zirconia support and for the metal oxide supported on zirconia after calcination at 850° C. is also provided. The infrared spectra shown in FIG. 1 demonstrate that the supported (or added) metal oxide becomes incorporated or embedded into the texture of the ZrO$_2$ structure and becomes stabilized by the structure. Thus, the interaction between the support and the metal oxide allows the metal oxide to be chemically stable and have durability in an acidic chemical stream. One skilled-in-the-art will understand that the infrared spectra can be obtained by conventional means, such as FTIR spectroscopy.

Figure 2:
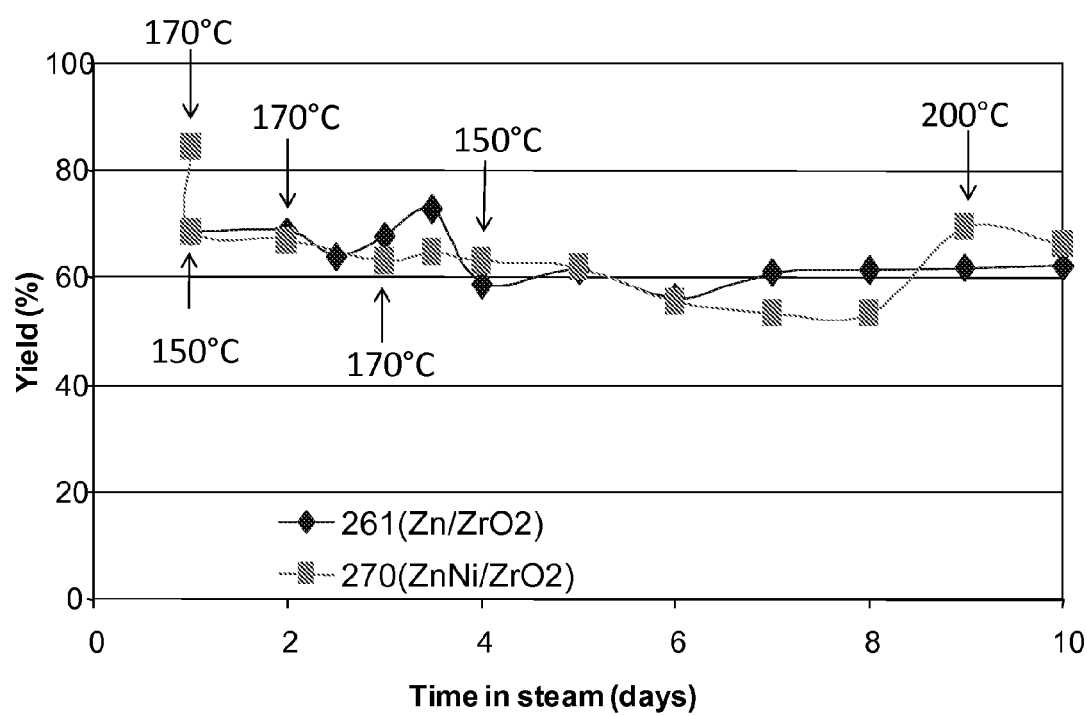
FIG. 2 is graphical comparison of the catalytic activity associated with metal oxide supported zirconia catalysts according to one aspect of the present disclosure in a waste oil feedstock that contains 10% free fatty acids (FFA)

Referring now to FIG. 2, the catalytic activity of several metal oxide supported zirconia catalysts in a stream of feedstock containing 10% FFA is illustrated by plotting the yield of FAME products as a function of exposure time. The various data points are taken over a range of temperatures (150-200° C.) and at an overall feed rate of 0.5 mL/min (0.18 mL/min for methanol; 0.32 mL/min for oil). Even after exposure to the feedstock for a period of seven days, the catalyst systems of the present disclosure exhibit performance similar to that obtained during the first day of exposure.

The catalysts prepared according to the teachings of the present disclosure can be used with diverse feedstocks ranging from refined oils to waste oils. A feedstock that contains FFA becomes neutralized during the esterification reaction of FFA with an alcohol. As shown in Table 4, the acid number for brown grease (178 mg KOH/mL) changes as the reaction proceeds. In fact, the acid number decreases to 0.5 or less over a 7 hour reaction period. In comparison, the acid number remains relatively high at 36 or more in a similar reaction utilizing a conventional acid catalyst.

TABLE 4

| | Acid Number | | |
|---|---|---|---|
| Catalysts | 1 hr | 2 hr | 7 hr |
| ZnO/ZrO2 | 39.5 | 12 | 0.05 |
| ZnO—NiO/ZrO2 | 90 | 41 | 0.5 |
| ZnO—La2O2 | 76.6 | 14 | 0.07 |
| H2SO4 | | 38 | 36 |

The ZnO/ZrO$_2$ catalyst exhibits very high activity for esterification reactions. When this catalyst is used within a continuous flow reactor, the FAME yields are very high (almost to completion). However, dissolution of Zinc can also be very high, reaching as much as 10,000 ppm during the initial three days, and then decreasing slowly as shown in Table 5. This dissolution is predictable and can be predetermined because the Zinc metal is dissolvable by the acidic feedstock. The Zirconium species is also very stable even though it is in the acidic feedstock.

TABLE 5

| Day | FAME Yield (%) | Dissolved [Zn] in FAME (ppm) | Dissolved [Zr] in FAME (ppm) |
|---|---|---|---|
| 1 | 99.0 | 9700 | 2.1 |
| 2 | 99.0 | 10800 | 2.0 |
| 3 | 98.5 | 10030 | 1.8 |
| 4 | 99.3 | 5870 | 1.8 |
| 5 | 100.0 | 3920 | 1.8 |
| 6 | 98.8 | 2490 | 1.8 |

Figure 3:
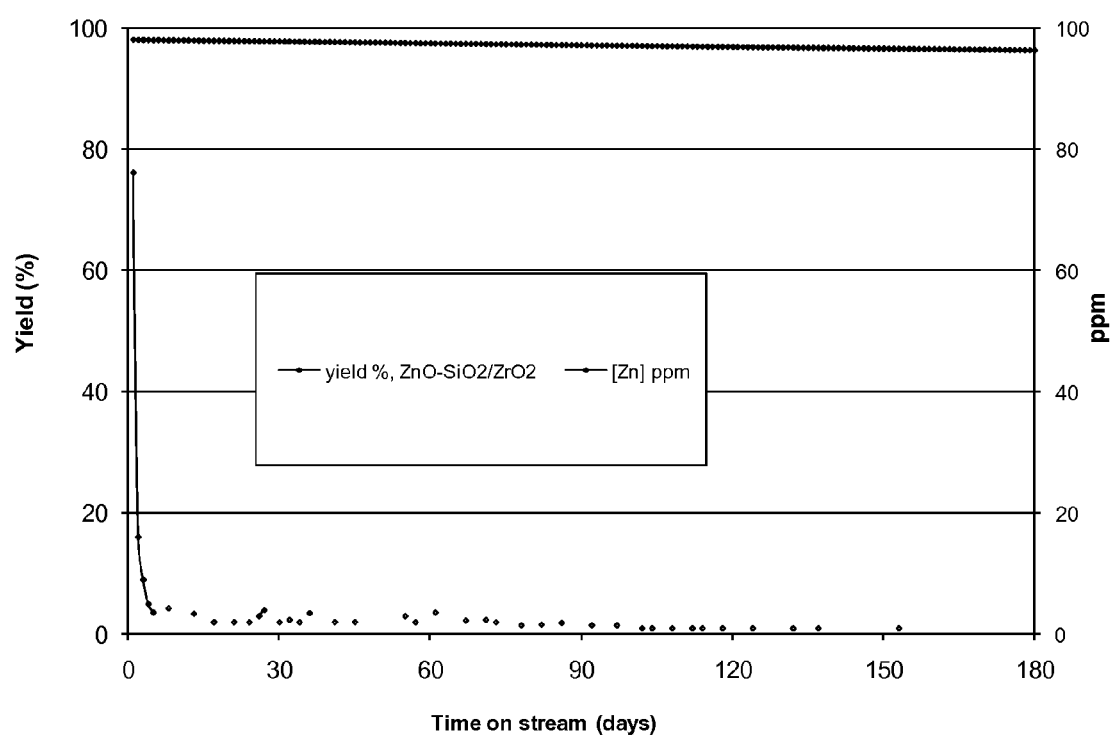
FIG. 3 is a graphical representation of the FAME yield (%) and Zinc concentration (ppm) in the FAME product eluted from a tubular reactor incorporating a ZnO—$SiO_2$/$ZrO_2$ catalyst prepared according to one aspect of the present disclosure.

When SiO$_2$ is added as a third component, the ZnO—SiO$_2$/ZrO$_2$ catalyst shows both high catalytic activity and high durability for long-term operation. Referring now to FIG. 3, by adding SiO$_2$ as a third component, the dissolution of Zn can be significantly decreased. In FIG. 3, the FAME yield (%) and Zn concentration (ppm) in the product eluded from a tubular reactor containing a ZnO—SiO$_2$/ZrO$_2$ catalyst under a temperature of 170° C., a retention time of 96 minutes, and a feed stream of oleic acid and methanol in a ratio of 1:5 is plotted as a function of time. The Zn concentration in the FAME phase becomes lower than 5.0 ppm after 5 days of operation. However, the yield of FAME is maintained above 95% for more than 6 months of operation.

In addition, ZrO$_2$ supported metal oxide catalysts are very effective with respect to both esterification and transesterification reactions within a very short retention time as shown in Table 6. Over a very short reaction time, a 90% FAME yield is attained from soybean oil containing 33% oleic acid with a methanol to oil ratio of 9:4 using a ZnO—TiO$_2$—Nd$_2$O$_3$/ZrO$_2$ catalyst at 210° C. The metal oxide catalysts of the present disclosure can significantly decrease the reaction temperature from the 300 to 450° C. used in conventional systems to about 130 to 200° C., while maintaining high activities for transesterification and esterification using low grade oils containing free fatty acids and water impurities. As previously shown in Table 2, a yield of 90% FAME was attained with only 32 minutes of residence time.

Since the free fatty acids and water content in oil directly affects the cost of a feedstock, with lower FFA and water being more expensive, it is more economical to use a feedstock with a high FFA and/or water content in a biodiesel production process. Conversion of lipids containing large amounts of FFA and water content has been a challenge that greatly impacts conversion efficiency of the triglycerides to FAME. ZrO$_2$ supported metal oxides catalyst can efficiently handle low grade waste oil. Therefore, the ability of the ZrO$_2$ supported metal oxide catalysts to use a variety of these less expensive lipids would make biodiesel much more competitive with petroleum-based fuels.

TABLE 6

| Feed rate, mL/min Oil + MeOH | Retention time (minutes) | FAME Yield (%) |
|---|---|---|
| 0.45 + 0.3 | 32 | 90 |
| 0.33 + 0.22 | 44 | 91 |
| 0.27 + 0.18 | 53 | 90 |
| 0.15 + 0.10 | 69 | 92 |
| 0.09 + 0.06 | 160 | 81 |

According to another aspect of the present disclosure, the catalysts may be prepared by starting with metal precursors to the desired metal oxides, such as but metal salts of Zn, Ce, La, Ni, or Zr, including but not limited to nitrates, sulfates, chlorides, and hydroxides (i.e., Zn(NO$_3$)$_2$, ZnSO$_4$, ZnCl$_2$, Zn(OH)$_2$, etc.). Aqueous metal salts or metal salt mixtures are added to ZrO$_2$ powders or Zr salt solutions. Because of the acidic property of the metal salt solution, the zirconia surface is changed to a hydrous form. The metal salt can change into a metal hydroxide in the aqueous solution. Mixed metal oxides are incorporated in the ZrO$_2$ structure through a sol-gel condensation process, an impregnation process, or a co-precipitation process. Through the condensation between hydrous zirconia and metal hydroxides, a network structure becomes stabilized. To make a fully developed network structure, aging with/without heating of the solution is preferred. For example, the solution may be aged for 12 hours at 110° C.; followed by 3~5 hours at 130° C. Finally, the soft gel-like mixture can be pelletized into a specific or desired shape or size. The gel is then calcined at 750° C. for about 30 minutes or more. Thus ZrO$_2$ based catalysts can be processed into pellet form prior to their use in a high temperature and pressure flow reactor.

According to another aspect of the present disclosure, the catalytic activities of the ZrO$_2$ supported metal oxide catalysts change upon the use of a different composition/combination of the supported metal oxides. The ZrO$_2$ supported single nine metal oxides (for example, ZnO/ZrO$_2$, NiO/ZrO$_2$, SiO$_2$/ZrO$_2$, TiO$_2$/ZrO$_2$, Nd$_2$O$_3$/ZrO$_2$, Yb$_2$O$_3$/ZrO$_2$, CeOx/ZrO$_2$, Al$_2$O$_3$/ZrO$_2$, La$_2$O$_3$/ZrO$_2$) and mixed metal oxides, i.e., a combination of the nine single metal oxides above (for example, ZnO—SiO$_2$/ZrO$_2$, ZnO—TiO$_2$/ZrO$_2$, ZnO—Nd$_2$O$_3$/ZrO$_2$, ZnO—NiO—Eu$_2$O$_3$/ZrO$_2$, ZnO—Yb$_2$O$_3$/ZrO$_2$, ZnO—TiO$_2$—Nd$_2$O$_3$, ZnO—SiO$_2$—Yb$_2$O$_3$/ZrO$_2$, ZnO—SiO$_2$—TiO$_2$—Yb$_2$O$_3$/ZrO$_2$, ZnO—SiO$_2$—TiO$_2$—Nd$_2$O$_3$/ZrO$_2$, ZnO—SiO$_2$—TiO$_2$—Yb$_2$O$_3$—Nd2O3/ZrO$_2$, etc.) may be used to facilitate esterification and transesterification reactions. However, one skilled-in-the-art will understand that some catalyst combinations may be more reactive under specific conditions, such as ZnO—CeO$_2$/ZrO$_2$ catalyst can be used in biodiesel production with oils that have lower free fatty acid content, while ZnO/ZrO$_2$ catalyst can be used to convert low grade oil (brown grease or yellow grease) to biodiesel.

A person skilled in the art will recognize that the measurements described are standard measurements that can be obtained by a variety of different test methods. The test methods described in the examples represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heterogeneous catalyst system for use in facilitating esterification or transesterification reactions in an acidic chemical stream, the catalyst system comprising:
   ZnO and one or more metal oxides selected from the group of SiO$_2$, TiO$_2$, Nd$_2$O$_3$, Yb$_2$O$_3$, CeO$_x$, La$_2$O$_3$, or mixtures thereof; and
   an oxide support; the support being ZrO$_2$, hydrous ZrO$_2$, or a mixture thereof;
   wherein the mixed metal oxides and the oxide support interact such that the metal oxide is chemically stable and has durability in an acidic chemical stream.

2. The catalyst system of claim 1, wherein the catalyst system is one selected from the group of ZnO—SiO$_2$/ZrO$_2$, ZnO—TiO$_2$/ZrO$_2$, ZnO—Nd$_2$O$_3$/ZrO$_2$, ZnO—Yb$_2$O$_3$/ZrO$_2$, ZnO—TiO$_2$—Nd$_2$O$_3$, ZnO—SiO$_2$—Yb$_2$O$_3$/ZrO$_2$, ZnO—SiO$_2$—TiO$_2$—Yb$_2$O$_3$/ZrO$_2$, ZnO—SiO$_2$—TiO$_2$—Nd$_2$O$_3$/ZrO$_2$, and ZnO—SiO$_2$—TiO$_2$—Yb$_2$O$_3$—Nd$_2$O$_3$/ZrO$_2$.

3. The heterogeneous catalyst system of claim 1, wherein the catalyst system comprises SiO$_2$, and has an integrity of over 99.9% after 5 days in a feed stream of oleic acid and methanol at a temperature of 170° C.

* * * * *